April 11, 1967
S. TJERNELD ETAL
3,313,472
FLEXIBLE BAGS
Filed March 3, 1966
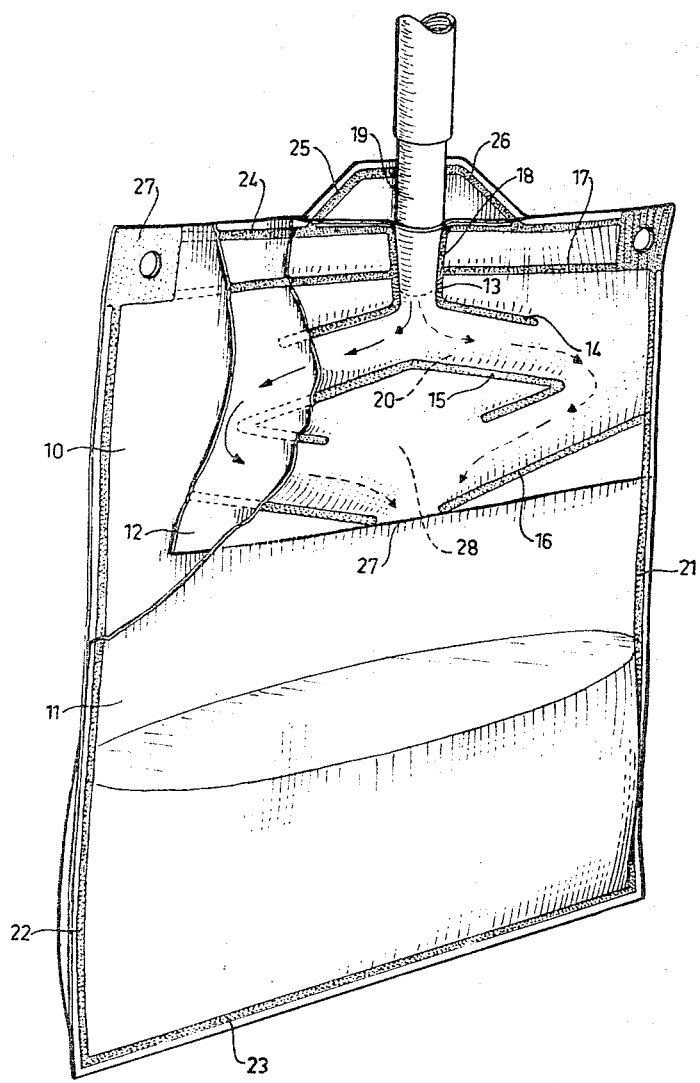

3,313,472
FLEXIBLE BAGS
Stig Tjerneld, Pilosvag 7, Bromma, Sweden, and Olle Höök, Karlbergsvag 30, Stockholm, Sweden
Filed Mar. 3, 1966, Ser. No. 531,401
1 Claim. (Cl. 229—62.5)

The present invention relates to a flexible bag of the kind having an inlet which opens into the bag through a non-return valve, said bag consisting of two walls of a flat foil material, such as plastics, joined by welding or heat sealing, the non-return valve consisting of a single valve flap of a flat foil material connected to one wall of the bag such as by welding.

As bags of this kind are generally used as disposable bags they must, of course, be cheap. Despite this requirement very high demands must be made with regard to the operation of the non-return valve. Thus, on the one hand, the non-return valve must be designed in such a way that it opens very easily, and on the other hand it must be adapted to close automatically and very rapidly at extremely low pressure differences.

The flexible bag according to the present invention fills these requirements most satisfactorily and is substantially characterized in that the valve flap is welded to one wall of the bag whilst leaving an inlet neck and an inlet passage communicating therewith, said inlet passage being divided into two branches diverging in open V-shape and then again converging in open V-shape, the two V-shaped passage branches forming between them a collecting pocket for any returning small amounts of liquid.

The invention will be described in more detail with reference to the accompanying drawing in which an embodiment chosen as an example is shown in perspective and partly in section.

The bag shown as an example is rectangular in shape and consists of two walls 10 and 11 which are flat when the bag is empty. These walls are made of two very thin foils of a suitable material, preferably plastics, such as polyethylene or the like. A strip preferably consisting of the same material as the walls of the bag has been disposed between the walls 10 and 11. In view of its function, the strip will hereinafter be called the valve flap 12.

The bag is produced by first welding or heat sealing the valve flap 12 to the wall 11 of the bag along the seams 13, 14, 15 and 16 and, if desired, also along the seam 17. Thereby there is formed between the valve flap 12 and the wall 11 of the bag an inlet neck 18 for receiving a suitable nozzle 19. Also, an inlet passage 20 communicating with the inlet neck and extending in zig-zag is thus formed. It should be noted that the foil of the valve flap 12 projects slightly beyond the foil used for the wall 11 of the bag.

When the valve flap 12 and the wall of the bag have been welded together as described, they are brought together with a further foil which is to form the wall 10 of the bag, and welds 21, 22, 23 and 24 are applied along the side edges and the top and bottom edges of the bag. If desired, the welds 13 and 17 may be made during this second welding operation, or they may alternatively be subjected to a further welding during this second welding operation.

The foil of the wall 10 of the bag likewise extends slightly beyond the top of the foil 11 and in the second welding operation described a broken weld 25 is applied at some distance from the inlet opening of the bag. Thereby a guide tongue 26 is formed which has the object of facilitating the introduction of the nozzle 19. In said second welding step also the upper corners of the bag may be welded into rectangular plates 27, for instance. On completion of the welding, the bag is cut outside the circumferential seams and may, in connection therewith, preferably be provided with holes 28 to facilitate hanging the bag on suitable hooks.

It will be clearly apparent from the drawing that liquid flowing in through the nozzle 19 may readily pass the non-return valve formed by the valve flap 12 and the wall 11 of the bag. Owing to the action of the liquid pressure and air pressure, respectively, any tendency of return flow will cause the valve flap 12 to be immediately pressed against the inside of the wall 11 of the bag and to effectively block any such tendency of return flow. If, for some reason (e.g. that the bag has tipped over and the valve did not act immediately), a minor amount of liquid should nevertheless pass the lower edge of the valve flap at the opening 27, the position of the bag at this moment is such that the small amount of liquid flowing back is collected in the pocket 28 formed by the seam 15. It will be appreciated that liquid flowing in through the passage 20 and tending to be reversed owing to an inadvertent pressure on the bag, for instance, will for the greater part be blocked in the passage or at any rate be subjected to such a reduction of pressure that it is not capable of forcing its way back through the nozzle 19 or out between the nozzle and the inside of the inlet neck 18.

It should be mentioned that a plurality of modifications and alterations of details are possible within the scope of the inventive idea.

We claim:

A flexible bag of the kind having an inlet which opens into the bag through a non-return valve, said bag consisting of two walls of a flat foil material, such as plastics, joined by welding or heat sealing, the non-return valve consisting of a single valve flap of a flat foil material which is connected to one wall of the bag, such as by welding, characterized in that the valve flap is welded to one wall of the bag whilst leaving an inlet neck and an inlet passage in communication therewith, said inlet passage being divided into two branches diverging in open V-shape and then again converging in open V-shape, the two V-shaped passage branches forming between them a collecting pocket for any returning small amounts of liquid.

References Cited by the Examiner
UNITED STATES PATENTS

| 2,779,314 | 7/1957 | Dreyer et al. | 229—62.5 |
| 2,804,257 | 8/1957 | Hasler et al. | 150—0.5 |
| 3,268,152 | 8/1966 | Swartz | 229—62.5 |

JOSEPH R. LECLAIR, Primary Examiner.
DAVID M. BOCKENEK, Assistant Examiner.